Figure 1:
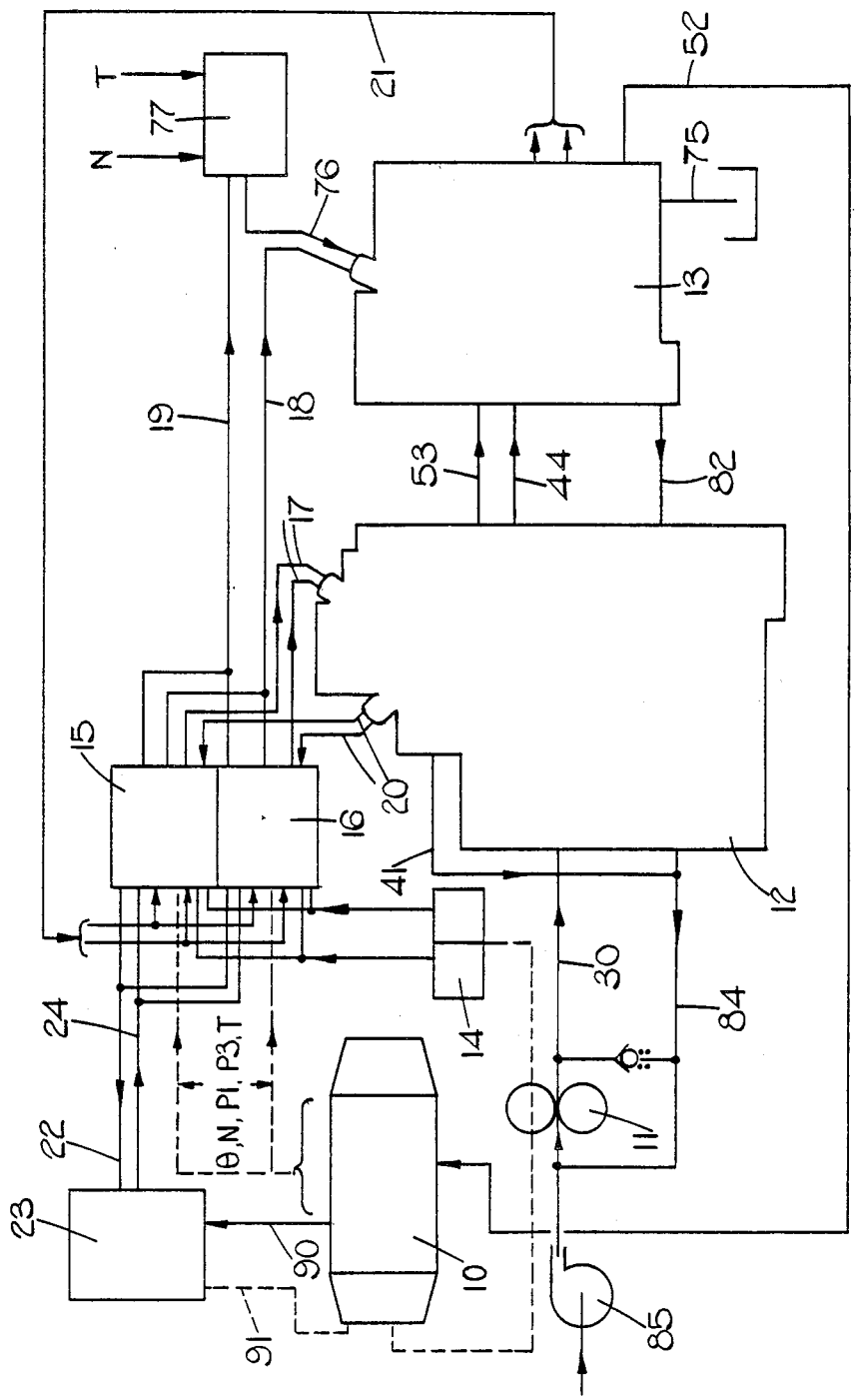

United States Patent [19]

Smith

[11] Patent Number: 4,473,999
[45] Date of Patent: Oct. 2, 1984

[54] FUEL CONTROL SYSTEM FOR A GAS TURBINE ENGINE

[75] Inventor: Trevor S. Smith, West Midlands, England

[73] Assignee: Lucas Industries Limited, Birmingham, England

[21] Appl. No.: 321,537

[22] Filed: Nov. 16, 1981

[51] Int. Cl.³ .............................................. F02C 9/28
[52] U.S. Cl. .................................................. 60/39.281
[58] Field of Search ...................................... 60/39.281

[56] References Cited

U.S. PATENT DOCUMENTS

| | | | |
|---|---|---|---|
| 3,991,569 | 11/1976 | Smith | 60/39.281 |
| 4,011,716 | 3/1977 | Smith | 60/39.281 |
| 4,187,673 | 2/1980 | Smith | 60/39.281 |
| 4,229,937 | 10/1980 | Smith | 60/39.281 |

FOREIGN PATENT DOCUMENTS

| | | | |
|---|---|---|---|
| 1447909 | 5/1977 | United Kingdom . | |
| 1513738 | 6/1978 | United Kingdom . | |
| 2002852 | 2/1979 | United Kingdom | 60/39.281 |

Primary Examiner—Louis J. Casaregola
Attorney, Agent, or Firm—Trexler, Bushnell & Wolters, Ltd.

[57] ABSTRACT

A fuel control system for a gas turbine engine comprises a variable metering device and a flow limiting valve arranged in series. The limiting valve is servo pressure operated to reduce fuel flow in response to unacceptably high levels of certain engine operating conditions and is additionally movable to a fully shut condition when the engine is stopped. The servo operating pressure is controlled by an electrically actuated pilot valve which can be energized to a first level to provide flow limitation, and to a second, higher level to effect shut down. The pilot valve can also be energized in a reverse direction to open the limiting valve when starting the engine.

11 Claims, 10 Drawing Figures

FUEL CONTROL SYSTEM FOR A GAS TURBINE ENGINE

This invention relates to a fuel control system for gas turbine engines.

It is known, for example, from U.K. Pat. No. 1465480, to provide a gas turbine engine fuel control system which includes a variable metering device and a control valve in series with the metering device. The aforesaid control valve is operated by a servo pressure to limit fuel flow in the event that selected engine operating conditions exceed predetermined levels. It is also arranged that the operating servo pressure for the control valve may be manually vented to shut the control valve when the engine is stopped. In the foregoing known control valves the servo operating pressure is controlled by a torque motor actuated by current signals from a control circuit which is responsive to the aforesaid engine operating conditions. It is increasingly regarded as desirable to provide that all aspects of engine control, including engine shut-down shall be electrically controlled in normal operation. In the interest of reliability it is also desirable that the number of components in any system, including electrically operated valves, shall be a minimum.

It is an object of the present invention to provide a gas turbine engine fuel control system which includes a combined flow limiting and shut-off control valve, and in which the flow limiting and shut-off functions are controlled by a single electrically operated actuating element.

According to the invention a fuel control system for a gas turbine engine comprises a variable metering device and a flow limiting valve in series with said metering device, said limiting valve including a flow control element responsive to a servo pressure signal, a pilot valve for regulating said servo pressure signal, means for biasing said pilot valve in dependence on the operating position of said control element, an electrical actuating device for urging said pilot valve against said biasing means, means for energising said actuating device at a first level at which the force exerted thereby is balanced by said biassing means at an intermediate position of said control element, and means for energising said actuating device at a second level at which the force exerted thereby overcomes said biassing means in all operating positions of said control element.

Figure 2:
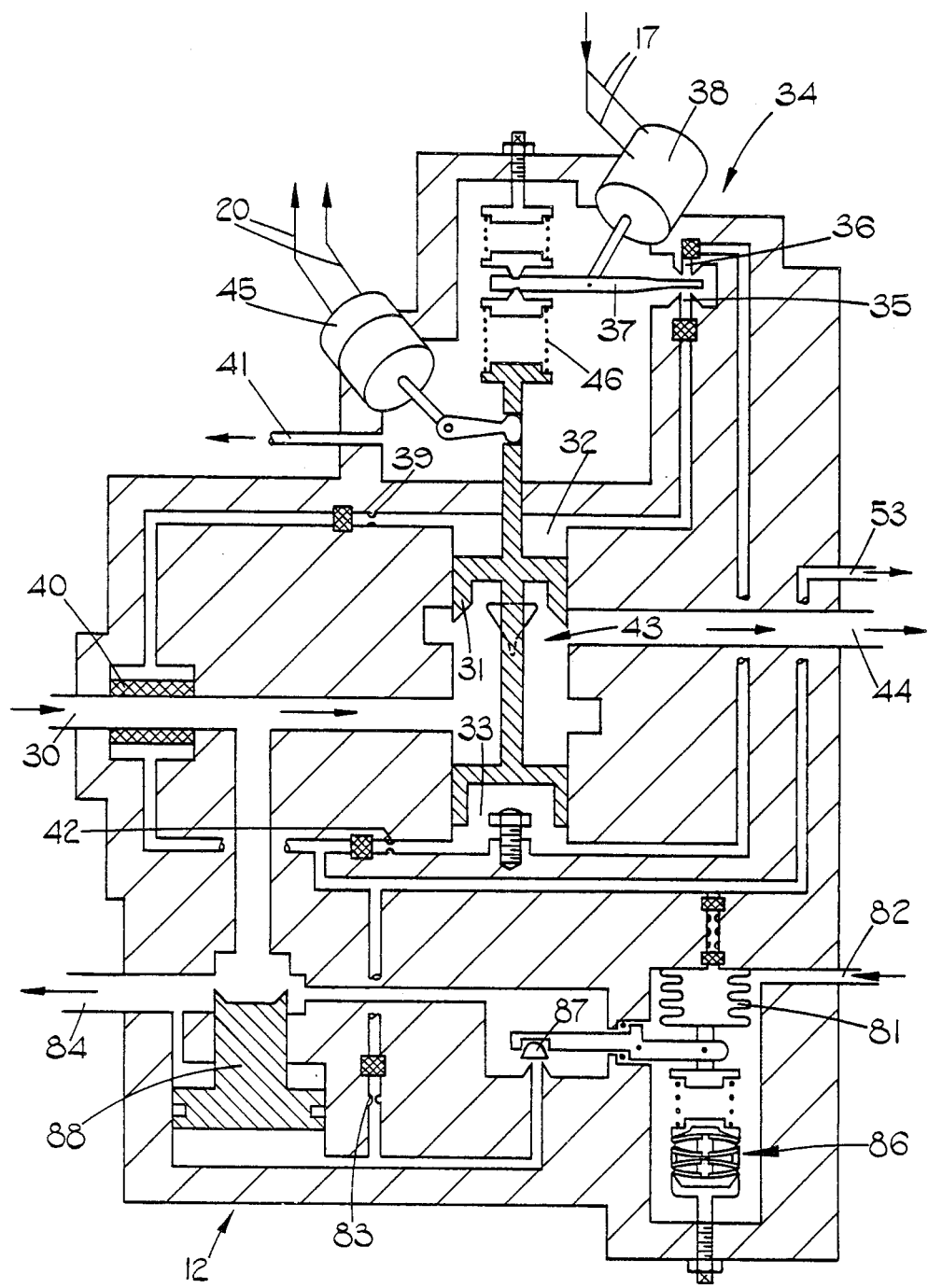
Figure 3:
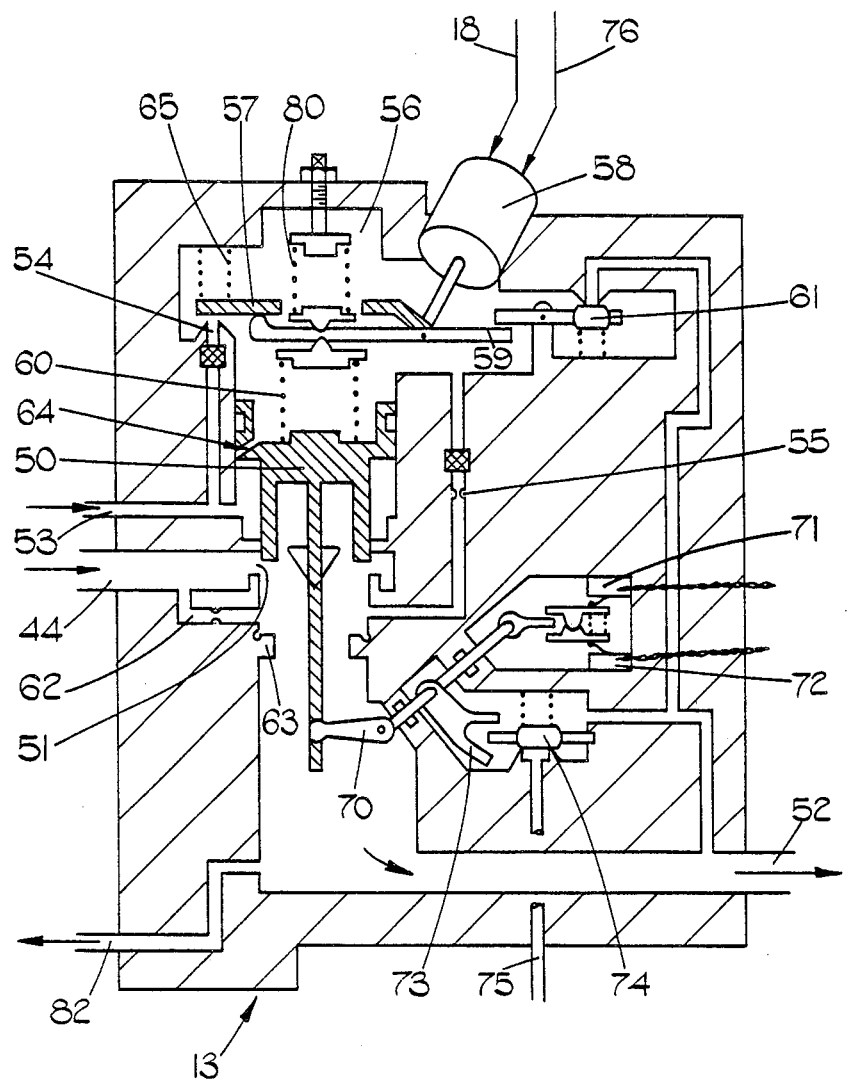
Figure 4:
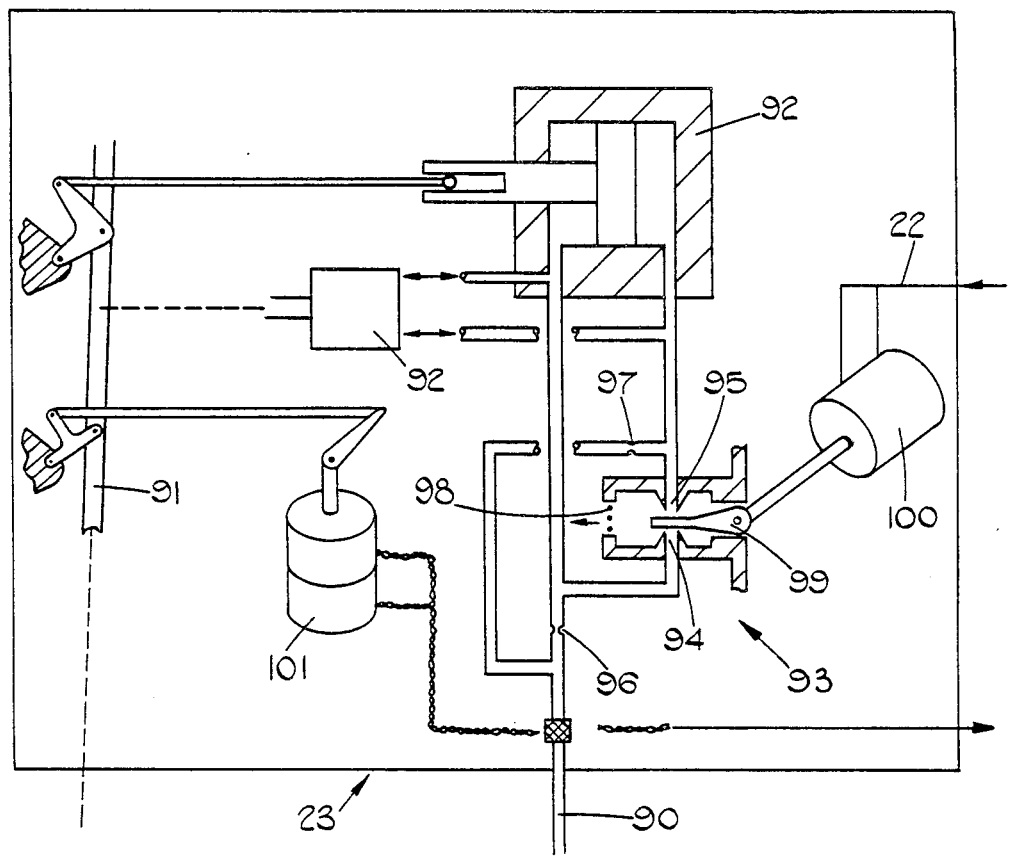
Figure 5:
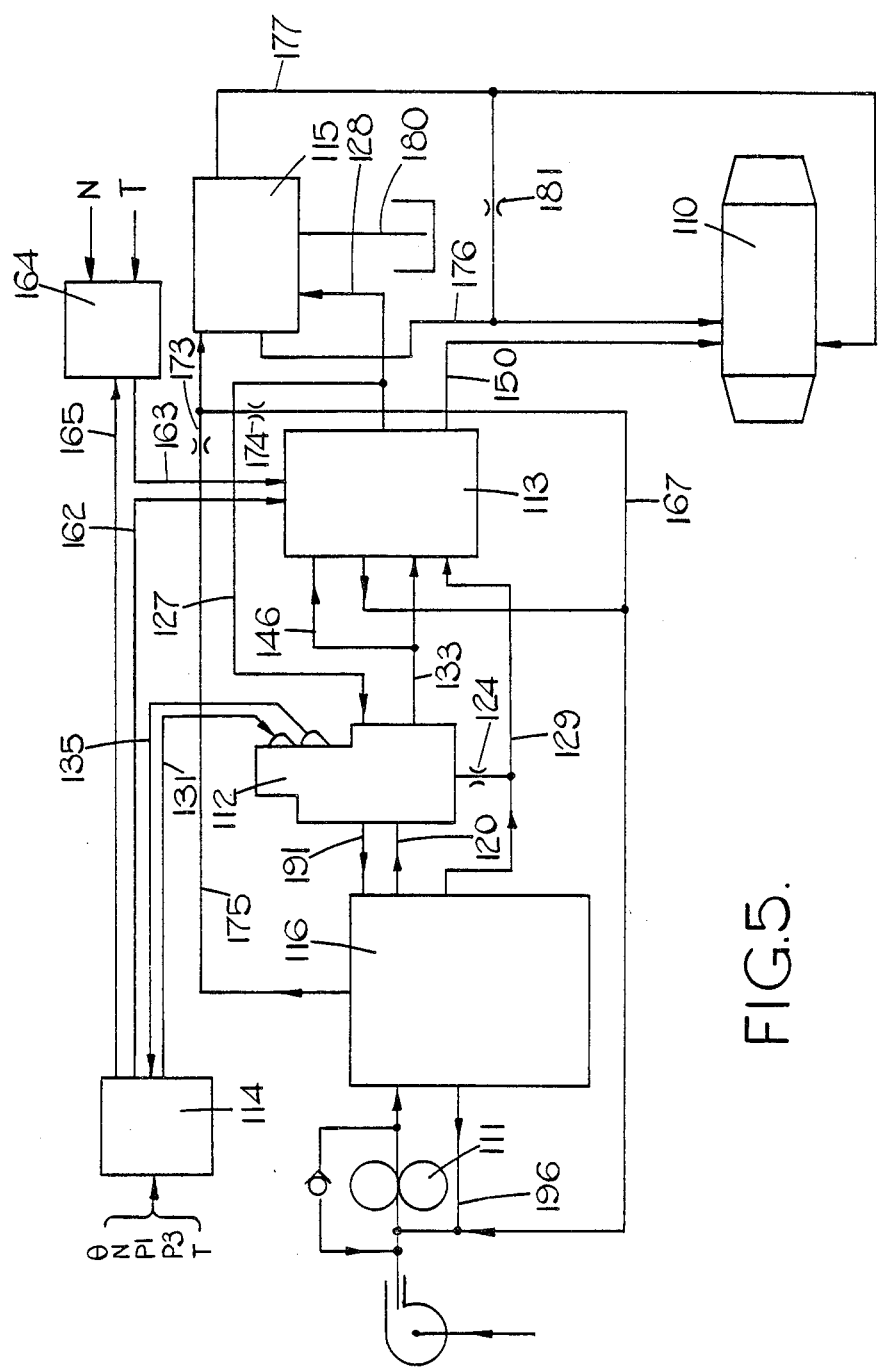
Figure 6:
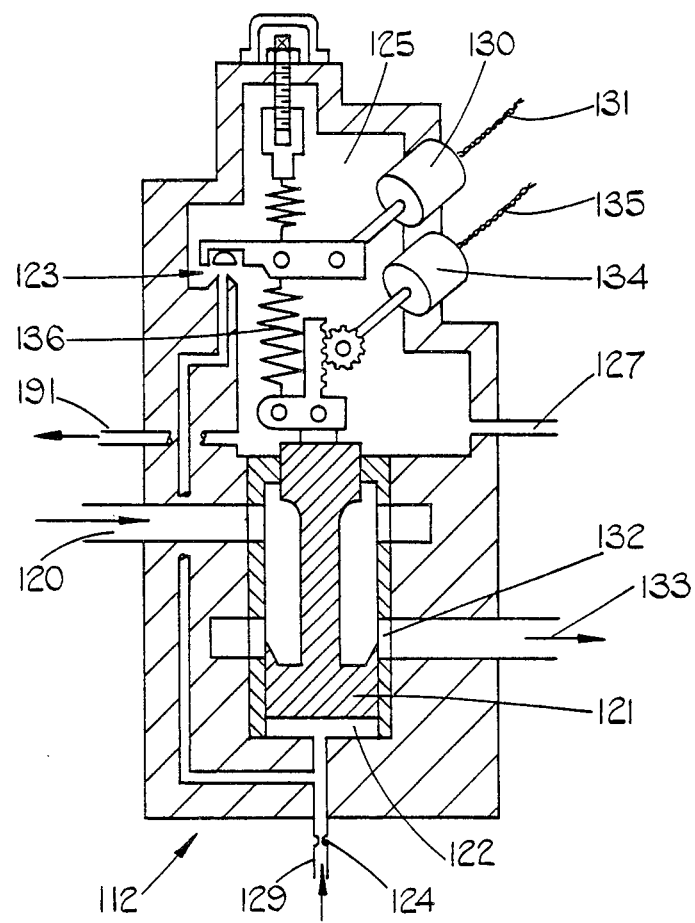
Figure 7:
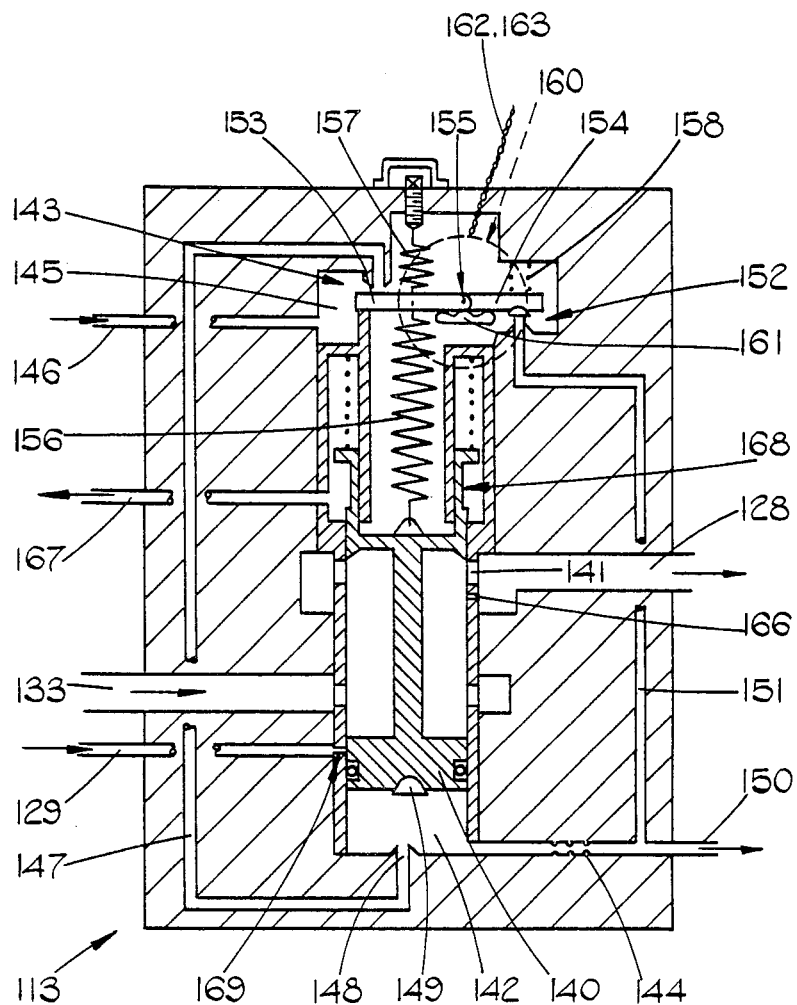
Figure 8:
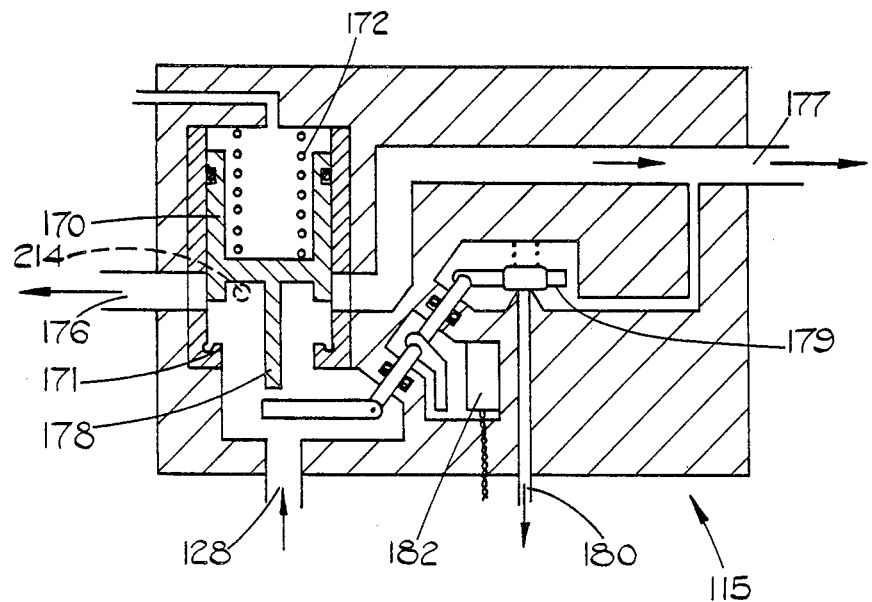
Figure 9:
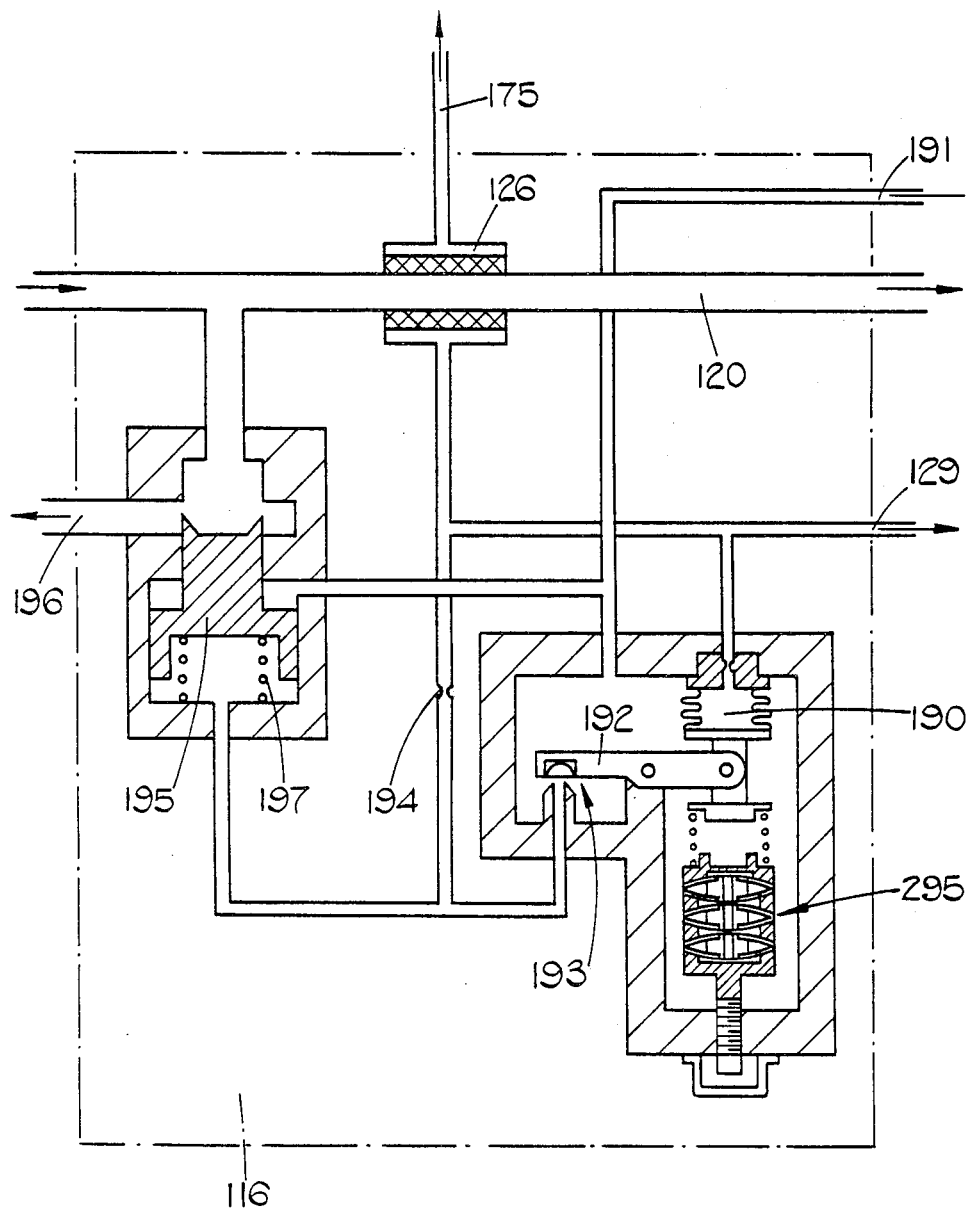
Figure 10:
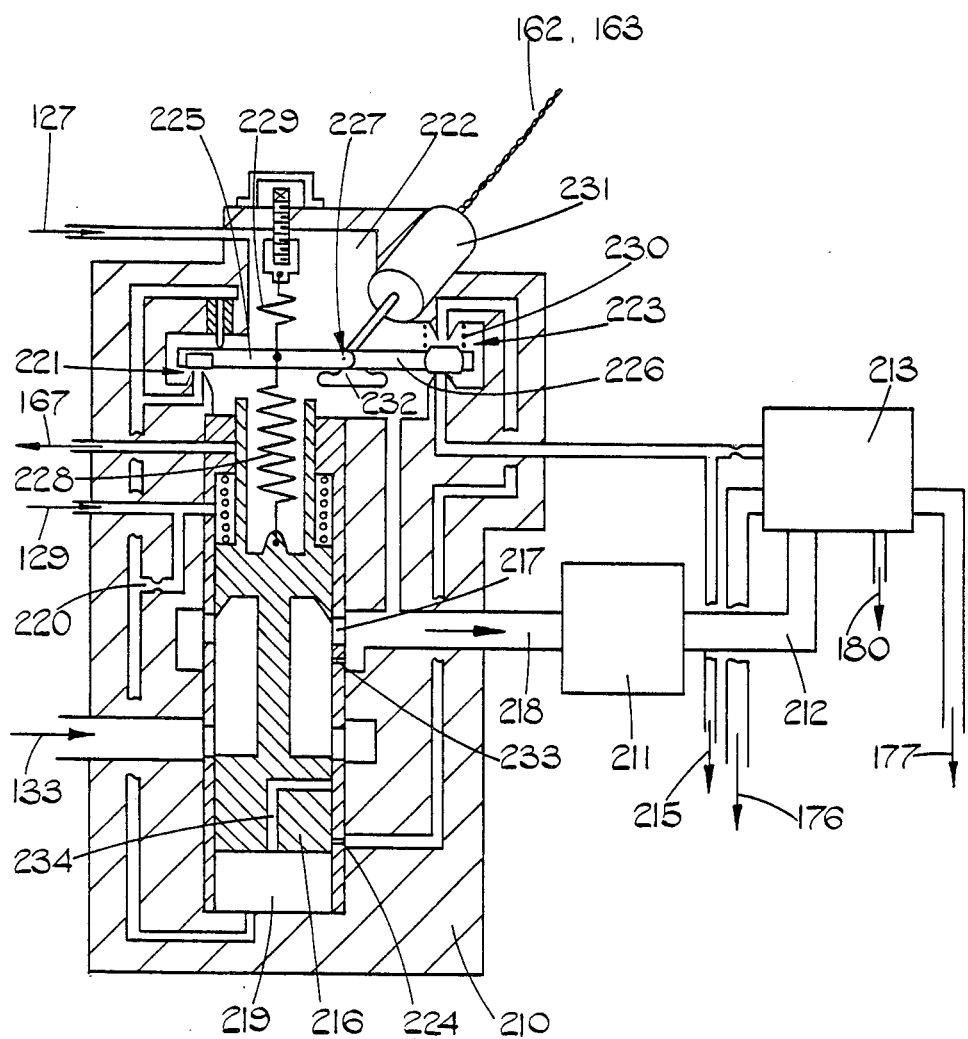

Embodiments of the invention will now be described by way of example only and with reference to the accompanying drawings in which:

FIG. 1 is a diagram of a gas turbine engine and an associated fuel control system, according to the invention, FIG. 2 is a diagram of a variable metering device forming part of the system of FIG. 1, FIG. 3 is a diagram of a combined flow limiting and shut-off control valve arrangement forming part of the system of FIG. 1, FIG. 4 is a diagram of a control device for inlet guide vanes for the engine of FIG. 1, FIG. 5 is a diagram of a gas turbine and an alternative embodiment of a fuel control system according to the invention, FIG. 6 is a diagram of a fuel metering device forming part of the system of FIG. 5, FIG. 7 is a diagram of a flow limiting valve forming part of the system of FIG. 5, FIG. 8 is a diagram of a combined pressure raising and shut-off valve forming part of the system of FIG. 5, FIG. 9 is a diagram of a spill valve arrangement forming part of the system of FIG. 5, and FIG. 10 shows an alternative arrangement of flow limiting valve and pressure raising valve.

As shown in FIG. 1 a gas turbine engine 10 is supplied with fuel from a pump 11 through a variable metering device 12 and a combined limiting and shut-off control valve arrangement 13, in series with the device 12. The pump 11 is driven mechanically from a shaft of the engine 10 and is also drivingly connected to duplicated electrical generators 14 each of which supplies electrical power to each of two duplicated electrical control circuits 15, 16. Each of the circuits 15, 16 is responsive to engine operating conditions, as for example engine throttle control setting $\theta$, engine speed N, compressor intake and delivery pressures Pl, P3 and engine combustion temperature T. Only one of the circuits 15, 16 is normally in operation, and the system includes provision, of a known type, for switching operation to the other of these circuits in the event that the currently-operating circuit malfunctions. The circuits 15, 16 provide output signals on lines 17 to the metering device 12 and on lines 18, 19 to the valve arrangement 13, in a manner later to be described. The circuits 15, 16 are also responsive to input signals on lines 20, 21 from the device 12 and valve arrangement 13 respectively. The circuits 15, 16 also provide electrical signals on a line 22 to a device 23 for controlling the position of inlet guide vanes on the engine 10, the circuits 15, 16 also being responsive to position input signals on a line 24 from the device 23.

The variable metering device 12 is shown in more detail in FIG. 2 and receives fuel through a pipe 30 from the pump 11. The device 12 includes a metering control element 31 which is responsive to the difference in the pressures in respective chambers 32, 33. A valve 34 has two aligned orifices 35, 36 and a control element 37 which is operable by a dual-coil torque motor 38 to provide simultaneous variation of flow through the orifices 35, 36. Current supply to the respective coils of the motor 38 is controlled by the respective circuits 15, 16 by way of the signals on lines 17. The orifice 35 is in series with a restrictor 39 and a filter 40 between the pipe 30 and a low pressure return line 41, the pressure in chamber 32 being that between the orifice 35 and restrictor 39. The orifice 36 is in series with a further restrictor 42 between the filter 40 and the line 41, the pressure in chamber 33 being that between the orifice 36 and restrictor 42.

The control element 31 regulates fuel flow through orifices 43 to a pipe 44 which communicates with the limiting and shut-off valve arrangement 13. The operating position of the element 31 is detected by a synchro resolver 45 having duplicated sets of rotor and stator windings, output signals from the respective stator windings being supplied on the lines 20 to respective ones of the control circuits 15, 16. A feedback spring 46 engages the metering element 31 and biases the control element 37 so that movement of the element 31 varies the bias on the element 37 in such a way as to cause the aforesaid movement of the metering element 31 to be opposed.

The valve arrangement 13 is shown in more detail in FIG. 3 and includes a flow control element 50 which is operable to regulate fuel flow through orifices 51 between the pipe 44 and a delivery pipe 52 to the engine 10. The element 50 is biased in an opening direction by the pressure in a line 53 which communicates with the filter 40 (FIG. 2). A pilot valve 54 and a restrictor 55 are arranged in series between the lines 53, 52, and the element 50 is responsive to a servo pressure signal in a chamber 56 between the valve 54 and restrictor 55. A control member 57 for the pilot valve 54 is freely rotatable on the shaft of a double-coil torque motor 58 and is biased by a spring 65 to shut the valve 54. A lever 59 is fixed to the shaft of the motor 58 and is engageable with the control member 57. A feedback spring 60 co-acts with the flow control element 50 and with the lever 59 in substantially the same manner as previously described for the spring 46 in the device 12. A valve 61 between the chamber 56 and the pipe 52 is spring biased to a shut position and co-acts with the lever 59 so that the valve 61 is opened only when the lever 59 is at or adjacent its fully anticlockwise position, as viewed in FIG. 3.

A restricted bypass 62 interconnects the pipes 44, 52, in parallel with the orifices 51, so that in an intermediate position of the control element 50 in which the orifices 51 are shut, fuel may still flow to the engine through the bypass 62. The control element 50 can, however, move into engagement with an abutment 63, in which position the orifices 51, the bypass 62 and the connection of the restrictor 55 to the pipe 52 are all shut. In this latter position a port 64 in the element 50 interconnects the line 53 and the chamber 56, so that the pressure in the chamber 56 is maintained equal to that in the line 53, so long as the valve 61 remains shut.

A linkage 70 co-acts with the flow control element 50 and with respective micro-switches 71, 72 which provide signals on the lines 21 to the circuits 15, 16 when the control element 50 is respectively in its fully shut and fully open positions. The linkage 70 also includes a part 73 which co-acts with a spring-loaded dump valve 74 to open the latter and connect the pipe 52 to a low pressure drain connection 75 when the control element 50 is in its fully shut position.

One coil of the torque motor 58 is energisable through the line 18 and the other coil is energisable through a line 76 from an amplifier 77 which is responsive to engine speed N and combustion temperature T, as well as to signals on the line 19 from the control circuits 15, 16 and is energised from the generators 14 (FIG. 1). In addition to the spring 60, the lever 59 is acted upon by a further adjustable spring 80 which opposes the spring 60. The anti-clockwise bias on the lever 59 thus increases as the control element 50 moves downwardly towards a shut position. The amplifier 77 includes means for limiting the current on the line 76 to provide a first, lower level of energisation which will be insufficient by itself to urge the lever 59 clockwise, and hence to open the valve 54, once a limiting downward position of the element 50 has been reached. The aforesaid lower level of energisation is such that, under the influence of current on line 76 alone, the control element 50 can be moved downwardly to a position in which the orifices 51 are shut, but the bypass 62 remains open. In order to effect further downward movement of the element 50 to shut off fuel flow completely it is necessary to provide a second, higher level of energisation by additionally energising the other coil of the motor 58, through the line 18.

Referring back to FIG. 2, a resilient bellows 81 is subjected internally to the pressure in the line 53, that is effectively to the pressure in the pipe 30. The bellows 81 is subjected externally to the pressure in the pipe 52, through a line 82 from the valve arrangement 13. The bellows 81 is thus responsive to the difference in pressure between the inlet of the metering device 12 and the outlet of the control valve arrangement 13, and positions a pilot valve 87 which is in series with a restrictor 83 between the filter 40 and a spill line 84 which communicates with the upstream side of the pump 11, the pressure in the line 84 being the boost pressure available from a backing pump 85 (FIG. 1). The valve 87 is also responsive to a plurality of bi-metal elements 86 which are responsive to the temperature of the fuel in line 82, and thus provide a density correcting factor to the valve 87. A spill valve 88 is urged open by the boost pressure in the line 84 and urged shut by the pressure intermediate the valve 87 and restrictor 83. The spill valve 88 is thereby positioned in response to the total pressure drop in such a way as to maintain this pressure drop substantially constant.

In normal operation of the system the flow control element of the shut-off valve arrangement 13 is in its upper fully open position and neither of the coils of the torque motor 58 are energised. In this condition the valve 54 is shut and the pressure in chamber 56 is the delivery pressure of the fuel in the pipe 52 to the engine. The pump delivery pressure applied through the line 53 urges the element 50 to its uppermost position. In the event that selected engine operating conditions, for example, speed N or combustion temperature T, exceed predetermined limits, the amplifier 77, provides a current signal on line 76 to one coil of the motor 58, to energise the lever 59 in a clockwise direction and open the valve 54. The resulting increase in pressure in the chamber 56 urges the element 50 downwardly to restrict fuel flow through the orifices 51, and this downward movement ceases in an equilibrium position in which the net bias applied by the springs 60, 65, 80 is balanced by the torque from the motor 58. As previously indicated, the current applied through the line 76 provides a lower level of energisation such that downward movement of the element 50 in these conditions is insufficient to bring it into contact with the abutment 63 and shut the bypass 62. The arrangement thus provides a limitation of fuel flow which prevents excessive engine speed or combustion temperature, but is not responsive to these conditions to shut off fuel flow entirely.

When engine shut-down is required a second current signal is provided from the operating one of the control circuits 15, 16 on both of the lines 18, 19. In these circumstances both coils of the motor 58 are energised to urge the lever 59 clockwise and to maintain the valve 54 open against the increasing anti-clockwise bias of the springs 60, 65, 80 as the element 50 moves towards its shut position. In the fully shut position of the element 50 the micro-switch 71 provides a signal causing both coils of the motor 58 to be de-energised. With the element 50 in its fully shut position, however, the restrictor 55 is isolated from the pipe 52 and high pressure in the line 53 is applied through the port 64 to the chamber 56 to maintain the element 50 shut independently of the subsequent position of the valve 54. In the shut position of element 50 the part 73 of the linkage 70 opens the valve 74 to connect the fuel outlet pipe 52 to the low pressure drain connection 75.

When the engine is started both coils of the motor 58 are energised to urge the lever 59 fully anti-clockwise against the combined effect of the springs 60, 65, 80 and in this fully anti-clockwise position the lever 59 opens the valve 61, venting the pressure in chamber 56 to the pipe 75. At this stage any air delivered by the pump 11 may be vented through the line 53, port 64 and valve 61. Venting of the pressure in chamber 56 allows the fuel pressure in the line 53 to lift the element 50 to its fully open position. In this position the part 73 of the linkage 70 allows the valve 74 to be shut by its spring. The linkage 70 also operates the micro-switch 72 to cause both coils of the motor 58 to de-energised, whereupon the lever 59 returns to an equilibrium position in which both the valves 54, 61 are shut. With the valve 54 shut the pressure in chamber 56 is that within the pipe 52, and the element 50 is maintained in its upper, fully open position by the pressure in the line 53. This condition corresponds to normal operation of the system, in which the arrangement 13 has substantially no effect on fuel flow, and the spill valve 87, (FIG. 2) is effectively responsive to the pressure across the metering device 12 alone.

If subsequently engine speed N or combustion temperature T exceed predetermined limits the amplifier 77 supplies an energising current on the line 76 to one coil of the motor 58, urging the lever 59 clockwise to lift the member 57 and open the valve 54. The consequent increase in servo pressure in the chamber 56 moves the control element 50 downwards to decrease flow through the orifices 51, until the reduced bias of the spring 60 allows the springs 65, 80 to urge the lever 59 anti-clockwise against the torque of the motor 58 and shut the valve 54. The lever 59 then moves anti-clockwise as the force exerted by the spring 60 decreases, until an equilibrium position is reached in which the forces exerted by the springs 60, 65, 80 balance the torque from the motor 58, in which equilibrium position the element 50 partly closes the orifices 51. As previously indicated the current supplied to the motor 58 on line 76 is limited so that the valve 54 will shut before the element 50 engages the abutment 63, so that a limited fuel flow to the engine 10 is maintained through the bypass 62.

The inlet guide vane control device 23 is shown in more detail in FIG. 4 and is powered by high pressure air from a compressor of the engine 10, delivered on a line 90. A linkage 91 is coupled to the engine inlet guide vanes and is powered by one or more pneumatic rams 92, these rams being responsive to air pressure signals derived from the line 90 through a valve 93. The valve 93 has aligned orifices 94,95 which communicate with the line 90 through respective restrictors 96,97. Air flows through the orifices 94,95 to a vent outlet 98 are simultaneously variable by a control member 99 operable by a double coil torque motor 100 in response to signals on the line 22 from the operating one of the control circuits 15, 16. Air pressures between the orifice 94 and restrictor 96 and between the orifice 95 and resticter 97 are applied to respective opposite sides of the rams 92. The position of the linkage 91, and hence of the inlet guide vanes is sensed by a synchro resolver 101, similar to the resolver 45 shown in FIG. 2, which supplies position feedback signals on the line 24 to the circuits 15, 16. The engine inlet guide vanes are thus positioned in accordance with the engine operating conditions sensed by the circuits 15,16.

In an alternative embodiment signals may be provided on both of lines 18,76 when speed N or temperature T exceeds a permitted level, to energise both coils of the motor 58 at a first, lower level, both coils being energised at a second, higher level when shut-down is required.

In a further alternative embodiment the torque motor 58 in the valve arrangement 13 may have a single coil which is energised to first and second levels respectively to limit flow and to cause the valve arrangement 13 to shut off.

In the embodiment shown in FIGS. 5 to 9 a gas turbine engine 110 is supplied with fuel from a positive displacement pump 111 through a variable metering device 112 and a flow limiting valve 113 in series with the metering device 112. Duplicated electrical control circuits, indicated at 114 correspond to the circuits 15, 16 described in connection with the previous embodiment, and are similarly powered by duplicated electrical generators driven by engine 110. The control circuits 114 are responsive to a plurality of engine operating conditions as for example engine throttle control setting $\theta$, engine speed N, compressor intake and delivery pressures Pl, P3 and engine combustion temperature T. Only one of the duplicated electrical circuits is normally in operation, and the system includes provision, of a known type, for switching operation to the other of these circuits in the event that the currently-operating circuit malfunctions. Fuel flow to the engine 110 from the limiting valve 113 is by way of a combined pressure raising and shut-off valve device 115. A servo operated spill valve arrangement 116 is responsive to a pressure difference between the outlet of the pump 111 and the outlet of the limiting valve 113, to spill fuel back to the inlet of the pump 111 and to maintain the aforesaid pressure difference substantially constant.

The variable metering device 112 is shown in more detail in FIG. 6 and receives fuel from the pump 111 on a supply line 120. The device 112 includes a metering control element 121 which is responsive to the pressure in a chamber 122. A valve 123 and a flow restrictor 124 are arranged in series between a chamber 125 and a high pressure supply line 129 to a filter connection 126 (FIG. 9) to the main fuel supply line 120. The chamber 125 communicates by way of a line 127 with an outlet passage 128 from the flow limiting valve 113. The pressure in chamber 122 is that intermediate the valve 123 and the restrictor 124. The valve 123 is pivotally movable by a dual-coil torque motor 130. Current supply to the respective coils of the motor 130 is controlled by signals on respective ones of a pair of lines 131 by the respective circuits in the electrical control 114, each separate coil of the torque motor 130 being effective to operate the valve 123.

The control element 121 regulates fuel flow through orifices 132 to a pipe 133 to the flow limiting valve 113. The operating position of the control element 121 is detected by a synchro-resolver 134 having duplicated sets of rotor and stator windings, output signals from the respective stator windings being supplied on lines 135 to respective ones of the duplicated circuits in the control 114. A feedback spring 136 coacts with the metering element 121 and with the valve 123 so that movement of the element 121 varies the bias of the valve 123 in such a way as to vary the pressure in chamber 122 to oppose the aforesaid movement of the metering element 121.

The flow limiting valve 113 is shown in more detail in FIG. 7 and includes a flow control element 140 which is operable to regulate fuel flow through orifices 141 between the pipe 133 and the outlet passage 128. The element 140 is urged in an opening direction by the pressure in a chamber 142 which is intermediate a valve 143 and flow restrictors 144. The valve 143 communicates with the outlet pipe 133 from the metering device 112 by way of a chamber 145 and a line 146, and with the chamber 142 by way of a line 147 which opens into the chamber 142 through a valve seat 148. A half-ball closure member 149 is carried by the control element 140 and engages the seat 148 to prevent flow through the line 147 when the element 140 is in its fully shut position. The chamber 142 communicates through the restrictors 144 with a supply line 150 to the starter jets of the engine 110. A line 151 connects the supply line 150 with the chamber 145 through a further valve 152. Control members 153, 154 for the respective valves 143, 152 are mounted for independent free pivotal movement about a common axis 155. A feedback tension spring 156 interconnects the control element 140 and control member 153 so that the member 153 is biased to an open position against an adjustbale tensioning spring 157. The control member 154 is biased by a spring 158 to a shut position of the valve 152.

A dual coil torque motor, indicated at 160, has an output element 161 which engages the control members 153, 154 and is rotatable clockwise about the axis 155 to shut the valve 143 and anti-clockwise to open the valve 152. The torque motor 160 has two coils, one of which is energisable through a line 162 from the electrical control 114, and the other of which is energisable through a line 163 from an amplifier 164 which is responsive to engine speed N and combustion temperature T, as well as to signals on a line 165 from the electrical control 114.

Clockwise movement of the control member 153 reduces the pressure in chamber 142 allowing the control element 140 to move downwardly to restrict flow through the orifices 141. This downward movement increases the tension in the spring 156, tending to open the valve 143, and the control element 140 comes to rest in an equilibrium position in which the feedback force on the element 53 is balanced by the torque from the motor 160. The amplifier 164 includes means for limiting the current on the line 163 so that this current alone will be insufficient to urge the member 153 clockwise, and hence to shut the valve 143, once a limiting downward position of the control element 140 has been reached. The limited current on line 163 provides a first, lower level of energisation such that the control element 140 moves to a position in which the orifices 141 are shut, but in which a bypass orifice 166 remains open. In order to effect further downward movement of the control element 140 to shut off fuel flow completely, it is necessary to additionally energise the other coil of the motor 160 through the line 162. When shut-down is required a higher level of energisation is provided by signals on the lines 162, 165, and the amplifier 164 responds to the signal on line 165 to provide current on line 163, independently of the level of engine speed N and combustion temperature T.

If, in response to shut-down signals on the lines 162,165, the control element 140 has moved downwardly to shut off orifices 141,166, the valve seat 148 will also be shut off. The torque motor 160 may subsequently be de-energised and the control element 140 will remain in its shut position. In this condition the outlet passage 128 communicates, through the orifices 141 and a peripheral groove 168 on the element 140, with a low pressure return line 167.

When the engine 110 is to be started the torque motor 160 is energised anti-clockwise opening the valve 152 and applying high pressure fuel through the line 151 to the chamber 142 and also through the supply line 150 to the engine starter jets.

Once the control element 140 has moved upwardly and the valve 148 is uncovered the torque motor 160 may be de-energised, shutting valve 152. Servo pressure and cooling fuel flow to the starter jets are once more available through the line 147. In the shut position of the control element 140 the high pressure supply line 129 communicates with the chamber 145 through an orifice 169 the pipe 133 and the line 146. When starting, therefore, high pressure is applied through the valve 152 to the line 151 and ensures an adequate pressure in the starter jet supply line 150, this pressure also being available in the chamber 142 to open the valve 113.

The combined pressure raising and shut-off valve 115 is shown in more detail in FIG. 8 and receives fuel through the outlet passage 128 of the limiting valve 113. A spool closure member 170 is baised to a shut position against a stop 171 by a spring 172 and by an intermediate pressure between the two restrictiors 173, 174 (FIG. 5) respectively in a high pressure line 175 from the filter connection 126 (FIG. 9) and the low pressure return line 167. Outlet passages 176, 177 communicate with upper and lower fuel manifolds respectively in the engine 110. The action of the spool closure 170 is such that fuel passes to the outlet passages 176, 177 only when the pressure in the system upstream of the valve 115 reaches a level which is high enough to provide adequate further pressures for operation of the system. In the absence of sufficient pressure in the outlet passage 128 (FIG. 7) the valve 115 operates to reduce flow. The limiter valve 113 can thus act as a pilot valve for the valve 115, since with the valve 113 shut the pressure in passage 128 is vented to the low pressure return line 167. In the shut condition of the valve 115 an abutment 178 on the spool 170 opens a dump valve 179 which connects the passage 177 to a drain outlet 180, the passage 176 also being drained by way of a restrictor 181 (FIG. 5) which interconnects the passages 176, 177. The abutment 178 also actuates a switch 182 to indicate that fuel flow has been shut off.

The spill valve arrangement 116 whown in FIG. 9 has a bellows unit 190 which is subjected internally to the pump delivery pressure in line 129, and externally to the pressure in the outlet passage 128 from the limiting valve 113, by way of the line 127, the chamber 125 in metering device 112, and a line 191. The bellows 190 acts on a control arm 192 fro a valve 193 which is in series with a flow restrictor 194 between the filter connection 126 and the line 191. The arm 192 is also acted upon by a stack 295 of bi-metal discs which are responsive to fuel temperature, and hence modified flow through the valve 193 in accordance with this temperature. A spill valve 195 is operable to spill fuel from the supply passage 120 to the upstream side of the pump 111 by way of a return line 196.

The spill valve 195 is responsive to the pressure intermediate the valve 193 and restructor 194 this pressure being dependent on the pressure drop across the series arrangement of the metering device 112 and the flow limiting valve 113, and serves to maintain this pressure drop substantially constant. A spring 197 urges the spill valve 195 to a shut position when the supply pressure from the pump 111 is low.

In normal operation the flow limiting valve 113 is wide open and imposes substantially no pressure drop on fuel flow therethrough. The pressure drop across the metering device 112 is thus substantially constant. The servo pressure regulated by the valve 123 in the metering device 112 is derived by way of the lines 127, 129 from the metering pressure drop, and the pressure forces on this valve are substantially constant. Moreover the servo flow through the metering device 112 is ultimately discharged through the line 127 to the outlet passage 128, and thus forms part of the engine fuel supply. Servo flow through the limiting valve 113 is discharged through the line 150 to the engine starter jets, and thus also forms part of the engine fuel supply. This arrangement has the effect that the pump 111 is not required to provide additional capacity for servo flow, in distinction from known systems in which servo flows are returned to low pressure upstream of the pump.

In an alternative embodiment signals may be provided on both of lines 162, 163 when speed N or temperature T exceeds a permitted level, to energise both coils of the motor 160 at a first, lower level. When shut-down is required an increased current is provided on line 162 and a signal on line 165 causes the circuit 164 to provide an increased current on line 163, whereby both coils of the motor 160 are energised at a higher level, shutting the valve 113.

In a further alternative embodiment the motor 160 may have a single coil which is energisable at either lower or higher levels, for flow limiting or shut-down respectively.

FIG. 10 shows an alternative arrangement of flow limiting valve and pressure raising valve which may be substituted for the corresponding valve described above with reference to FIGS. 5 to 9. The fluid and electrical connections to the valve shown in FIG. 10 are given the same reference numbers as the corresponding connections in FIGS. 5 to 9.

As shown in FIG. 10 a flow limiting valve 210 can receive fuel on the pipe 133 from the variable metering device 112, to deliver this fuel by way of a flow meter 211 and a line 212 to a combined pressure raising and shutoff valve device 213. The device 213 is substantially identical with the device 115 previously described with reference to FIG. 8, except that there is provided an additional port, indicated in dotted outline at 214 in FIG. 8, which communicates with starter jets for the engine by way of a line 215.

The valve 210 includes a flow control element 216 which is movable to regulate fuel flow through orifices 217 between the pipe 133 and an outlet 218 to the flow meter 211. The control element 216 is responsive to a servo pressure in a chamber 219, this pressure being that between a flow restrictor 220 and a valve 221 which are connected in series between the high pressure supply line 129 and a chamber 222, the chamber 222 communicating with the outlet 218. A two-position valve 223 is operable in one position to shut off communication between the chamber 222 and the line 215, and in its other position to shut off communication between the chamber 222 and an orifice 224. Control member 225, 226 for the respective valves 222, 223 are mounted for independent free pivotal movement about a common axis 227. A feedback tension spring 228 interconnects the control element 216 and the control member 225 so that the member 225 is biassed to a shut position against an adjustable tensioning spring 229. The control member 226 is biassed by a spring 230 to a position in which flow to the line 215 is shut off.

A dual coil torque motor 231 has an output element 232 which engages the control members 225, 226 and is rotatable clockwise about the axis 227 to open the valve 221, and anti-clockwise to move the element 226 against the spring 230 to permit flow to the line 215 and to shut off communication with the orifice 224. One coil of the motor 231 is energisable through the line 162 from the electrical control 114 (FIG. 5), and the other coil of the motor 160 is energisable through the line 163 from the amplifier 164 (FIG. 5) which provides a limited current signal on the line 163 in response to unacceptably high values of engine speed N or temperature T. In these circumstances the output element 232 is rotated clockwise to open the valve 221 against the spring 228 and reduction in pressure in chamber 219 allows the control element 216 to move downwardly to reduce flow through the orifices 217. The limited current on line 163 is insufficient to urge the member 225 clockwise, and hence to maintain the valve 221 open, once a limiting downward position of the control element 216 has reached. The limited current on line 163 provides a lower level of energisation such that the control element 216 can move to a position in which the orifices 217 are shut, but in which a by-pass orifice 233 remains open. In order to effect further downward movement of the control element 216 to shut off fuel flow completely, it is necessary to energise the other coil of the motor 231 through the line 162. When shut-down is required a higher level of energisation is provided on both of the lines 162, 163, as previously described.

If, in response to shut-down signals on the lines 162, 163 the control element 216 has moved downwardly to shut off orifices 217,233, the chamber 219 communicates with the orifice 224 through a port 234 in the control element 216. In this condition the chamber 219 communicates with the low pressure return line 167 through the open port of the valve 223 and the chamber 222. The outlet 218 also communicates with the low pressure return line 167 through the chamber 222. The torque motor 231 may thereafter be de-energised and the valve 221 shut without affecting the position of the control element 216.

When the engine is to be started the torque motor 231 is energised anti-clockwise to shut off communication between the chamber 222 and orifice 224 and to connect the chamber 222 to the starter jet supply line 215. The valve 221 will be shut and high pressure supplied on the line 129 lifts the control element 216 to open the orifices 233, 217. This movement of the control element 216 shuts off the orifice 224 and the torque motor 231 may subsequently be de-energised without affecting operation of the valve 210 as a whole.

As indicated above during starting fuel is supplied to the starter jets directly from the chamber 222 and valves 223. Thereafter the combined pressure raising and shut-off valve 213 opens and after de-energisation of the torque motor 231 a cooling fuel flow is supplied to the starter jets through the port 214 and the line 215.

In an alternative embodiment both coils of the torque motor 231 may be energised at a lower level to effect flow limiting by the valve 210, and at a higher level to effect shut-off, as previously described with reference to FIGS. 3 and 7.

In a further alternative embodiment the torque motor 231 may have a single coil which is energisable to first and second levels respectively to limit flow or to effect shut-off.

I claim:

1. A fuel control system for a gas turbine engine, comprising a variable metering device and a flow limiting valve in series with said metering device, said limiting valve including a flow control element, means for applying a servo pressure and a biasing pressure to said control element to urge the latter in respective opposite directions, a first pilot valve for regulating said servo pressure, means for biasing said first pilot valve in dependence on the operating position of said control element, an electrical actuating device for urging said first pilot valve against said biasing means, means for energising said actuating device in a first direction at a first level at which the force exerted thereby is balanced by said biasing means at an intermediate position of said control element, means for energising said actuating device in said first direction at a second level at which the force exerted thereby overcomes said biasing means in all operating positions of said control element to set said servo pressure at a level at which said flow control element is urged to a shut position, valve means operable by said control element in said shut position thereof for modifying one of said pressures to maintain said control element in said shut position, and a second pilot valve operable by energisation of said actuating device in a second direction to restore said one pressure to its unmodified state, whereby operation of said valve means causes said control element to be maintained in its shut position independently of the operating position of said first pilot valve, and operation of said second pilot valve renders said control element responsive to subsequent operation of said first pilot valve.

2. A system as claimed in claim 1 in which said actuating device has two energisable elements, said energising means comprising means energising one of said elements to provide said first level of energisation, and for energising both of said energisable elements to provide said second level of energisation.

3. A system as claimed in claim 1 in which said actuating device has two energisable elements, said energising means comprising means for energising both of said elements at said first level of energisation, and for energising both of said elements at said second level of energisation.

4. A system as claimed in any preceding claim in which said limiting valve includes first and second parallel orifices through which fuel can flow from said metering device to said engine, said biassing means being settable so that said second orifice remains open in said intermediate position of said flow control element.

5. A system as claimed in claim 1 in which said first pilot valve is in a fuel flow path to the engine from upstream of said metering device.

6. A system as claimed in claim 1 in which said variable metering device comprising a control member responsive to a second servo pressure, said system including means for maintaining a substantially constant pressure difference between an inlet and an outlet of said metering device.

7. A system as claimed in claim 1 in which said energising means comprises a circuit responsive to a speed of the engine to provide an energising signal at said first level when said speed exceeds a predetermined limit.

8. A system as claimed in claim 7 in which said energising means comprises means for supplying an electrical signal indicative of a requirement to shut off fuel flow to the engine, said circuit being responsive to said shut-off signal to provide said second level energising signal.

9. A system as claimed in claim 1, in which said limiting valve flow control element includes means, operable in said end position of the control element, for maintaining said first servo pressure at a level which causes said flow control element to be held in said end position.

10. A system as claimed in claim 1 in which said one pressure is said servo pressure.

11. A system as claimed in claim 1 in which said one pressure is said biasing pressure.

* * * * *